US008510157B2

(12) United States Patent
Kothari et al.

(10) Patent No.: US 8,510,157 B2
(45) Date of Patent: Aug. 13, 2013

(54) CALL TRACKING FOR ONLINE CONTENT ITEMS

(75) Inventors: Anshul Kothari, Sunnyvale, CA (US); Surojit Chatterjee, Fremont, CA (US); Chen Chen, Sunnyvale, CA (US); Jian Zhou, Milpitas, CA (US)

(73) Assignee: Google Inc., Mountain View, CA (US)

( * ) Notice: Subject to any disclaimer, the term of this patent is extended or adjusted under 35 U.S.C. 154(b) by 316 days.

(21) Appl. No.: 12/828,158

(22) Filed: Jun. 30, 2010

(65) Prior Publication Data

US 2012/0004978 A1 Jan. 5, 2012

(51) Int. Cl.
*G06Q 30/00* (2012.01)
(52) U.S. Cl.
USPC ........................................................ 705/14.1
(58) Field of Classification Search
USPC ........................................................ 705/14.1
See application file for complete search history.

(56) References Cited

U.S. PATENT DOCUMENTS

| | | |
|---|---|---|
| 2008/0162286 A1 | 7/2008 | Lieberman et al. |
| 2008/0214162 A1* | 9/2008 | Ramer et al. ............... 455/414.2 |
| 2008/0248815 A1* | 10/2008 | Busch ........................ 455/456.5 |
| 2009/0067599 A1 | 3/2009 | Agarwal et al. |
| 2009/0240538 A1 | 9/2009 | Sweeney et al. |

FOREIGN PATENT DOCUMENTS

WO WO2007/055847 5/2007

OTHER PUBLICATIONS

Authorized Officer K. Hong. International Search Report and Written Opinion in International Application No. PCT/US2011/042615, mailed Feb. 29, 2012, 11 pages.
Authorized Officer Nora Lindner, International Preliminary Report on Patentability in International Application No. PCT/US2011/042615, mailed Jan. 17, 2013, 8 pages.

* cited by examiner

*Primary Examiner* — Daniel Lastra
(74) *Attorney, Agent, or Firm* — Fish & Richardson P.C.

(57) ABSTRACT

This specification relates to tracking phone calls related to online content items. In general, one aspect of the subject matter described in this specification can be embodied in methods that include the actions of determining a probability that a call to a phone number resulted from a first interaction of a set of interactions. In general, another aspect of the subject matter described in this specification can be embodied in methods that include the actions of determining a rank score for an online content item, including for each call of a plurality of phone calls to the phone number, attributing the call to an online content interaction of a set of online content interactions; determining, using the rank score, whether to provide the online content item to a client device; and providing the online content item to the client device upon determining to do so using the rank score.

21 Claims, 6 Drawing Sheets

|  | Bid | Pclick | Expected Rev |
|---|---|---|---|
| Ad1 | $10 | .1 | $1 |
| Ad2 | $10 | .05 | $.5 |

FIG. 3A

|  | Bid (click) | Bid (call) | Pclick | Pcall | Expected Rev |
|---|---|---|---|---|---|
| Ad1 | $10 | 0 | .1 | 0 | $1 |
| Ad2 | $10 | $20 | .05 | .05 | $1.50 |

FIG. 3B

CALL TRACKING FOR ONLINE CONTENT ITEMS

BACKGROUND

This specification relates to tracking phone calls related to online content items, such as phone calls made in response to online advertising.

Advertisers provide advertisements in different forms in order to attract consumers. An advertisement ("ad") is a piece of information designed to be used in whole or in part by a user, such as a particular consumer. Ads can be provided in electronic form. For example, online ads can be provided as banner ads on a web page, as ads presented with search results, or as ads presented in a mobile application.

Advertisers are interested in how effectively their online campaigns generate sales leads. Apart from online purchases, many advertisers close their business over phone calls or consider phone calls as strong sales leads. For some businesses, customers who pick up the phone and make a call after viewing an online ad may be ten times more likely to make a purchase than customers who click on a link.

SUMMARY

In general, one aspect of the subject matter described in this specification can be embodied in methods that include the actions of determining a probability that a call to a phone number resulted from a first interaction of a set of interactions, wherein each interaction of the set of interactions is associated with a particular client device and a particular time; and associating a value with the first interaction based on the determined probability. Other embodiments of this aspect include corresponding systems, apparatus, and computer program products.

These and other embodiments can optionally include one or more of the following features. Determining the probability includes comparing a time when the call was made to the particular time associated with the first interaction; and considering a value measure associated with the first interaction. The set of interactions comprises a set of ad impressions of an ad, with each ad impression referring to a delivery of the ad to a particular client device at a particular time. The ad includes the phone number. The value measure associated with the first interaction is based on the placement position of the ad within content for the first ad impression.

Determining the probability includes: determining a first location associated with the call; determining a second location associated with the client device associated with the first interaction; and comparing the first location and the second location.

The actions further include, for each interaction of the set of interactions, determining a probability that the call resulted from the interaction; and attributing the call to the interaction having the highest probability. The actions further include, for each interaction of the set of interactions, determining a probability that the call resulted from the interaction; and attributing the call in a fractional amount to each interaction of the set of interactions based on the probability that the call resulted from the interaction.

The actions further include for each interaction of the set of interactions, determining a probability that the call resulted from the interaction; and attributing the call to an interaction having a determined probability that exceeds a threshold and, if no interaction has a determined probability that exceeds the threshold, attributing the call in a fractional amount to each interaction of the set of interactions based on the probability that the call resulted from the interaction. The actions further include determining a probability that a call to a phone number was associated with a first keyword.

In general, another aspect of the subject matter described in this specification can be embodied in methods that include the actions of determining a rank score for an online content item, wherein the online content item includes a phone number, and wherein determining the rank score comprises: for each call of a plurality of phone calls to the phone number, attributing the call to an online content interaction of a set of online content interactions, wherein each online content interaction refers to a delivery of the online content item to a particular client device at a particular time, determining a probability of a call using the online content interactions attributed to the phone calls, wherein the probability estimates the probability that a future online content interaction will result in a call to the phone number, and using the probability of a call in determining the rank score for the online content item; determining, using the rank score, whether to provide the online content item to a client device; and providing the online content item to the client device upon determining to do so using the rank score. Other embodiments of this aspect include corresponding systems, apparatus, and computer program products.

These and other embodiments can optionally include one or more of the following features. Using the probability of a call in determining the rank score comprises determining a user interaction probability based on the probability of a call and a predicted click-through rate for the online content item. Using the probability of a call in determining the rank score comprises: obtaining a call bid and a click bid from an online content provider, wherein the call bid specifies an amount of money the online content provider is willing to pay for a call resulting from a delivery of an online content item, and wherein the click bid specifies an amount of money the online content provider is willing to pay for a click on an online content item; determining a call rank score based on the probability of a call and the call bid; determining a click rank score based on a predicted click-through rate for the online content item and the click bid; and determining the rank score based on the call rank score and the click rank score.

Determining the rank score further comprises: for each call of the plurality of phone calls to the phone number, determining whether the call was a good call based on a duration of the call; determining a probability of a good call using the attributions of the calls determined to be good calls; and using the probability of a good call to determine the rank score. A good call is one having a duration that exceeds a threshold duration or is within a duration range.

Determining the rank score further comprises: for each call of the plurality of phone calls to the phone number, determining whether the call was a good call based on detection of one or more keywords spoken during the call; determining a probability of a good call using the attributions of the calls determined to be good calls; and using the probability of a good call to determine the rank score.

Determining the rank score further comprises: for each call of the plurality of phone calls to the phone number, obtaining a rating from an online content provider regarding the quality of the call and determining whether the call was a good call based on the rating; determining a probability of a good call using the attributions of the calls and their respective ratings; and using the probability of a good call to determine the rank score.

The online content item is an ad. The actions further include: receiving a request for one or more ads; determining a plurality of candidate ads including the ad; and using the rank score to select the ad from the candidate ads and providing the ad in response to the request. The actions further comprise: receiving a request for a plurality of ads for presentation with content; determining a plurality of candidate ads including the ad; selecting a plurality of responsive ads including the ad and assigning a position to each responsive ad; and using the rank score to boost the ad's position among the responsive ads and providing the responsive ads in response to the request.

Particular implementations may realize one or more of the following advantages. For example, phone calls made in response to online advertising can be attributed to specific online interactions, and the attribution may be used to improve selection of online content including the online advertising. The ability to attribute calls to specific online interactions may be used in permitting advertisers to increase the effectiveness of their advertising campaigns by bidding for calls.

The details of one or more implementations are set forth in the accompanying drawings and the description below. Other features, aspects, and advantages will become apparent from the description, the drawings, and the claims.

BRIEF DESCRIPTION OF THE DRAWINGS

FIG. 3A shows a table illustrating how expected revenue can be determined for an online content item.

FIG. 3B shows a table illustrating how expected revenue can be determined for an online content item based on a probability of a call.

DETAILED DESCRIPTION

Figure 1:
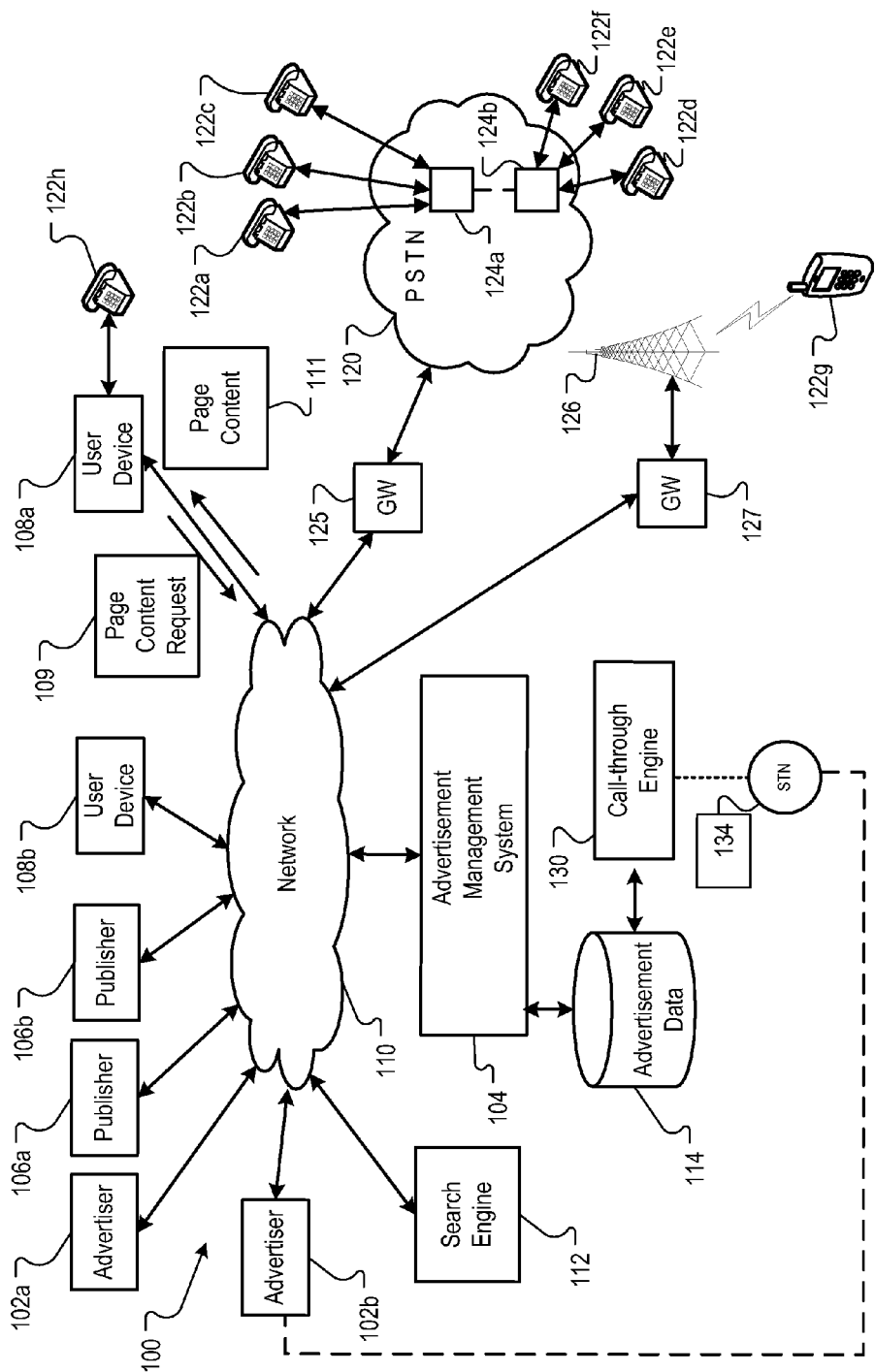
FIG. 1 is a block diagram of an example online advertising environment.

Techniques are provided for determining the effectiveness of advertisements or other online content items in generating phone calls, and using the determined effectiveness in improving advertisements or other content items, or in providing compensation associated with the advertisements or other online content items. These techniques may involve including a telephone number in an advertisement or inserting a dynamically-generated phone number on an advertiser's site. Two examples of ways in which an advertisement may result in a phone call are a simple example in which an end user sees an advertisement and calls a phone number included in the advertisement, and a more complex example in which the end user clicks on an advertisement and then visits the advertiser's site within a certain time period (e.g., 30 days), finds a phone number on the site, and calls the phone number. In either case, two major challenges associated with determining the effectiveness of the advertisement are, first, determining how to relate a particular call to a particular ad impression/query without using a separate number for each keyword or each ad impression, and, second, how to incorporate phone calls into a measurement of an advertisement's quality. In general, an advertisement that causes a user to make a phone call to an advertiser is substantially more valuable to the advertiser than an advertisement that causes the user to click on the advertisement.

Techniques also are provided for correlating calls with specific ad impressions by using a probabilistic model that uses signals such as the area code of the caller, the time of the call, the time of a search query, and past history of calls.

According to these techniques, attribution of calls to specific ad impressions may be accomplished through a probability model. For each pairing of a call and an ad impression for a given advertising campaign, factors including, for example, an ad impression's quality, a query time, and a user location, are considered to determine the probability that the call happened because of the particular ad impression. This probability may be used in many ways, including attributing a call to multiple ad impressions proportionally to the probability that each ad impression resulted in the call, attributing the entire call to the ad impression with the highest probability, or using a threshold-based approach that attributes the call entirely to a single ad impression if the corresponding probability is greater than a threshold (for example, 0.5), and otherwise attributing fractions of the call to multiple ad impressions.

Offline calls resulting from an advertisement may be used to adjust a rank score associated with the advertisement. The rank score can be used, for example, to select the advertisement in an auction, or determine an order in which the advertisement is presented relative to other advertisements are presented on a display. Typically, a rank score is based on a quality score for the advertisement and a bid for an interaction with the advertisement. A quality score is based on, for example, the ad's click-through rate, the relevance of the ad text, overall historical keyword performance, a landing page associated with the ad, and so on. In some implementations, the rank score is based on an estimated revenue figure that can be determined using a quality score and a bid.

For example, using the attribution of calls to ad impressions as discussed above, a model may be generated to predict the probability (pCall) that a call will result from an ad impression. This probability could be incorporated into the ad's rank score in many ways, including computing a user interaction probability as a combination of pCall and pCTR (the probability of a click) and using that probability instead of pCTR when computing the rank score, taking a bid for a call (call_bid) which is separate from a bid for url click (max cpc), and computing the ad's rank score as, for example, pCTR*max_cpc+pCall*call_bid. In the latter example, the call bid could be per keyword or a single bid for an entire advertising campaign.

In addition, the probability of a call (pCall) can be improved from just predicting the probability of a call to predicting the probability of a good call. There are many ways that a good call may be defined, including, for example, by using the duration of the call as a way to judge if the call was good or bad. For example, all calls longer than one minute are designated as good calls. As another alternative, advertisers report back the value of each call, these reported values are normalized, and the normalized values are used as indications of the quality of the call.

Referring to FIG. 1, the techniques may be implemented in an example online environment 100. The online environment 100 can facilitate the identification and serving of content items, such as web pages and advertisements, to users. A computer network 110, such as a local area network (LAN), wide area network (WAN), the Internet, or a combination thereof, connects advertisers 102*a* and 102*b*, an advertisement management system 104, publishers 106*a* and 106*b*, user devices 108*a* and 108*b*, and a search engine 112.

Although only two advertisers (102a and 102b), two publishers (106a and 106b) and two user devices (108a and 108b) are shown, the online environment 100 may include large numbers (e.g., thousands) of advertisers, publishers and user devices. The network 110 can communicate with other networks, both public and private, such as a public switched telephone network (PSTN) 120 and/or a cellular network 126.

In some implementations, one or more advertisers 102a and/or 102b can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of these different types of advertisements, or any other type of electronic advertisement document 120. The advertisements may also include embedded information, such as links, meta-information, and/or machine executable instructions, such as HTML or JavaScript™.

A user device, such as user device 108a, can submit a request 109 for page content 111 to a publisher or the search engine 112. In some implementations, the page content 111 can be provided to the user device 108a in response to the page content request 109. The page content can include advertisements provided by the advertisement management system 104, or can include executable instructions (e.g., JavaScript™ instructions) that can be executed at the user device 108a to request advertisements from the advertisement management system 104. Example user devices 108 include, for example, personal computers, mobile communication devices, and television set-top boxes.

In some implementations, a mobile device requests ads from the advertising management system 104. The request can be from a specific application running on the mobile device. The advertising management system 104 provides one or more ads to the mobile device for presentation according to the specific application.

Advertisements can also be provided from the publishers 106. For example, one or more publishers 106a and/or 106b can submit advertisement requests for one or more advertisements to the system 104. The system 104 can respond by sending the advertisements to the requesting publisher 106a or 106b for placement on one or more of the publisher's web properties (e.g., websites and other network-distributed content). The advertisements can include embedded links to landing pages (i.e., pages on the advertisers' websites to which a user is directed when the user clicks an ad presented on a publisher website). The advertisement requests can also include content request information. This information can include, for example, the content itself (e.g., page or other content document), a category corresponding to the content or the content request (e.g., arts, business, computers, arts-movies and arts-music), part or all of the content request, content age, content type (e.g., text, graphics, video, audio and mixed media), and geo-location information.

In some implementations, a publisher 106 can combine the requested content with one or more of the advertisements provided by the system 104. This combination of content and advertisements can be sent to the user device 108 that requested the content (e.g., user device 108a) as page content 111 for presentation in a viewer (e.g., a web browser or other content display system). The publisher 106 can transmit information about the advertisements back to the advertisement management system 104, including information describing how (e.g., in HTML or JavaScript™), when, and/or where the advertisements are to be rendered.

Publishers 106a and 106b can include general content servers that receive requests for content (e.g., articles, discussion threads, music, video, graphics, search results, web page listings and information feeds), and retrieve the requested content in response to the requests. For example, content servers related to news content providers, retailers, independent blogs, social network sites, or any other entities that provide content over the network 110 can be publishers.

Advertisements can also be provided through the use of the search engine 112. The search engine 112 can receive queries for search results. In response, the search engine 112 can retrieve relevant search results from an index of documents (e.g., from an index of web pages).

The search engine 112 can also submit a request for advertisements to the system 104. The request may include a number of advertisements desired. This number may depend on the search results, the amount of screen or page space occupied by the search results, or the size and shape of the advertisements, for example. The request for advertisements may also include the query (as entered, parsed, or expanded), information based on the query (such as geo-location information, whether the query came from an affiliate, and an identifier of such an affiliate), and/or information associated with, or based on, the search results. Such information may include, for example, identifiers related to the search results (e.g., document identifiers), scores related to the search results (e.g., information retrieval ("IR") scores), snippets of text extracted from identified documents (e.g., web pages), full text of identified documents, or feature vectors of identified documents. In some implementations, IR scores can be computed from, for example, dot products of feature vectors corresponding to a query and a document, page rank scores, and/or combinations of IR scores and page rank scores.

The search engine 112 can combine the search results with one or more of the advertisements provided by the system 104. This combined information then can be forwarded to the user device 108 that requested the content as the page content 111. The search results can be maintained as distinct from the advertisements, so as not to confuse the user between paid advertisements and search results.

The advertisers 102, user devices 108, and/or the search engine 112 can also provide usage information to the advertisement management system 104. This usage information can include measured or observed user behavior related to advertisements that have been served, such as, for example, whether a conversion or a selection related to an advertisement has occurred. The advertisement management system 104 performs financial transactions, such as crediting the publishers 106 and charging the advertisers 102 based on the usage information. Such usage information can also be processed to measure performance metrics, such as a click-through rate ("CTR"), conversion rate, and call-through rate ("KTR").

A click-through can occur, for example, when a user of a user device selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three users click on the content item, then the CTR for that content item is 3%. Other usage information and/or performance metrics can also be used.

A "conversion" occurs, for example, when a user consummates a transaction related to an advertisement that was previously served. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a website, viewing at least a certain number of web pages, spending at least a predetermined amount of time on a website or web page, or registering on a website. In another example, a conversion can include a purchase made using a phone (e.g., during a voice call with a salesperson), or a detection of a particular keyword or phrase (e.g., "buy" or "purchase") spoken during a phone conversation. The detection of a particular keyword or phrase may be accomplished, for example, by transcribing the phone conversation and searching the text of the transcription Other actions that constitute a conversion can also be used.

A call-through can occur, for example, when a user calls a telephone number associated with an advertisement returned by the publisher or the advertising management system 104.

In addition to the advertisements being selected based on content such as a search query or web page content of a publisher, the advertisements can also be selected from an auction. In some implementations, the advertisement management system 104 includes an auction process. An advertiser 102 may be permitted to select, or bid, an amount the advertiser is willing to pay for each telephone call to the advertiser as a result of a user viewing an advertisement and calling the telephone number associated with the advertiser listed in the advertisement. For example, advertisers A, B, and C may respectively select, or bid, a cost-per-call of $0.05, $0.07, and $0.10. The amount advertiser A will pay for a call placed to the advertiser A is $0.05, the amount advertiser B will pay is $0.07, and the amount advertiser C will pay is $0.10. Since advertiser C is willing to pay more per call, this may result in an advertisement of advertiser C being provided more frequently than advertisements of advertisers A and B. The advertisements, associated usage data, and bidding parameters described above can be stored as advertisement data in an advertisement data store 114.

As can be appreciated from the foregoing, the advertising management system 104 permits the serving of advertisements targeted to documents served by the publishers 106 and the search engine 112. Additionally, the usage information described above can be used by the advertisement management system 104 to serve higher performing advertisements that are more likely to elicit a response from users of the user devices 108a and 108b.

In some implementations, the serving of the advertisements, such as the advertisement 120, can be further optimized by tracking whether the advertisers associated with the advertisements are contacted by users calling the advertiser.

The environment 100 can include a public switched telephone network (PSTN) 120 coupled to the network 110 by a gateway 125. Telephone devices 122a-122f can communicate over the PSTN 120. The PSTN 120 includes switching elements 124a-124b for identifying information from calls received from telephone devices 122a-122f and directing these calls to the called party. The PSTN 120 can be, for example, a circuit-switched telephone network.

Telephone devices 122a-122f comprise any telecommunication device operable to electronically receive and transmit audio, including voice and dual-tone multi-frequency (DTMF) data. Generally, a telephone device operates through transmission of electric signals over the PSTN 120 to allow users to communicate. The environment 100 may include other communication devices such as cellular phones, IP phones, soft phones, and/or other communication devices that may communicate over the network 110 either alone or in conjunction with the PSTN 120 and/or other networks. In some implementation, telephone numbers provided by Internet advertisements direct call initiation requests from the telephone device 122 to the switching element 124 and from the switching element to the calling party.

The switching element 124 comprises any hardware, software, and/or firmware operable to route calls between devices in the PSTN 120 and the entity associated with the telephone number dialed. For example, the switching element 124 may receive a request to initiate a call from the telephone device 122 and based, at least in part, on the request, route the call to another element in communication with the PSTN 120, such as the advertisement management system 104.

In addition to the PSTN network 120, other telephone networks and/or protocols can also be used. For example, a cellular telephone 122g can communicate with the network 110 over a cellular network 126 and a gateway 127. Likewise, a voice over Internet Protocol (VoIP) telephone 122h can communicate over the network 110.

In some implementations, the advertisement management system 104 can associate a telephone number that is displayed on a web-based advertisement with an advertiser. The advertisement management system 104 can include a call-through engine 130 that may include instructions, algorithms, or other directives for mapping a telephone number displayed in an Internet advertisement to an associated advertiser 102. For example, a user of the user device 108a may call the number displayed on an Internet advertisement by using the telephone 122a. The switching element 124 may receive a request to initiate a call that identifies a telephone number presented in an Internet advertisement, where the identified telephone number is associated with the advertisement management system 104 and, in response to the request, forward the call to the advertisement management system 104. The call-through engine 130 can map the dialed number to the advertiser 102. In connection with identifying the advertiser 102, the call-through engine 130 may route, switch or otherwise transmit the call in response to the request to the advertiser 102. Usage and billing data for the telephone call can also be collected and updated by the advertisement management system 104 in response to the telephone call. A similar call placement and routing process can also be used if the user of the user device 108 placed the call using the cellular telephone 122g or the VoIP phone 122h. The advertiser, such as the advertiser 102b, also may track the call by monitoring received calls and reporting information about the calls to the advertisement management system 104.

In some implementations, the advertisement management system 104 can purchase the use of many unique telephone numbers. The advertisement management system 104 can uniquely associate these telephone numbers with the advertisers 102 and display these telephone numbers in advertisements for the advertisers 102. Accordingly, when the telephone numbers 134 are called, the calls are routed to the advertisement management system 104 and then routed to the advertisers 102.

In some implementations, a telephone number 134 can include a common telephone number with many extensions. Therefore, more than one advertiser 102 or other entity can be associated with the same common telephone number. However, each extension is only assigned to one entity. Therefore, a telephone number 134 that is a common telephone number with an extension is unique to the advertiser 102 associated with that telephone number and extension. For example, the telephone number "888-888-8888" can be associated with more than one advertiser 102; but the telephone number "888-888-8888, ext. 123" is only associated with one advertiser 102.

In some implementations, the telephone numbers 134 can be used to determine whether a user contacts the advertiser 102 as a result of viewing the advertisement provided by the advertising management system. If, for example, a user contacts the advertiser 102 by dialing a particular telephone number 134, the call-through engine 130 can determine that the user viewed the particular telephone number 134 on the web-based advertisement. If, however, a user contacts the advertiser by dialing a different telephone number, it may be concluded that the user most likely did not see the web-based advertisement that displayed the particular telephone number 134, or that the advertisement was not the reason for the call, since the second telephone number is not listed in the advertisement.

In some implementations, users can opt-out of having their phone calls linked to advertisements. For example, after dialing, a user can be presented with an audible option (e.g., to press a number or speak a word) to opt-out. Other measures to protect user privacy also may be used.

Figure 2:
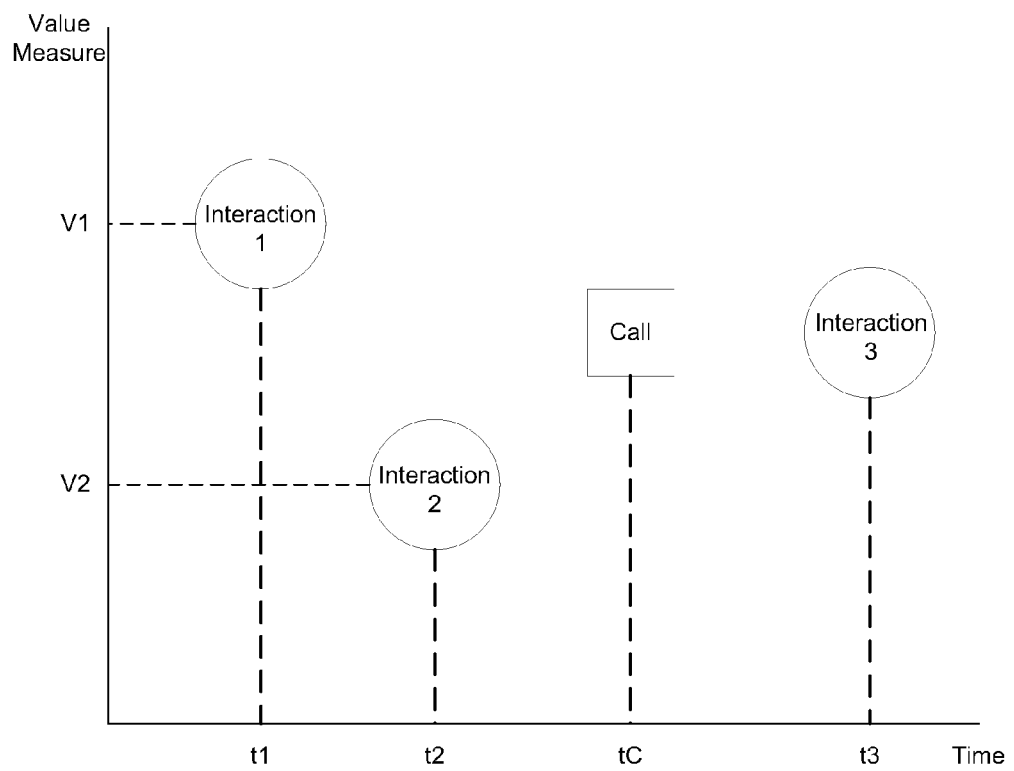
FIG. 2 shows an example timing diagram including three online interactions and a phone call.

FIG. 2 shows an example timing diagram including three online interactions and a phone call. The timing diagram is discussed to illustrate techniques for determining a probability that a call to a phone number resulted from a given interaction.

Each interaction represents an interaction with an online content item (e.g., a content item provided by advertising management system 104 to a user device 108). The interactions are associated with unique user devices and unique times. An online content item can be, for example, an advertisement. An interaction can be, for example, an impression (providing the content item to a user device that presents the content item), a user clicking on the content item, or the like.

The online content item is associated with a phone number. For example, the content item can display the phone number, or provide a link to the phone number (e.g., so that a mobile device dials the phone number when the link is clicked).

Each interaction has an associated value measure. For example, where a user is presented with multiple content items, the value measure of a particular content item can be based on the relative position of the content item. Where the content item is an advertisement, the value measure can be higher for positions higher on a web page, and the value measure can be higher for positions at the top of the page than for positions on the right side of the page.

Interaction 1 occurs at t1, interaction 2 occurs at t2, and interaction 3 occurs at t3. A phone call is made at tC. The phone call is made to the phone number. Because interaction 3 occurred after the phone call, the probability that interaction 3 resulted in the phone call can be determined to be zero.

For each of interactions 1 and 2, a probability can be determined that the interaction resulted in the phone call. Determining the probability can include considering a number of signals, and a classifier can be trained to accept the signals and determine estimated probabilities. Two signals that may be determined from the example shown in FIG. 2 are the time of the interaction and the value measure of the interaction.

The time of the interaction can be compared to the time when the call was made. For example, for interaction 1, the difference between the call time and the interaction time (tC−t1) can be calculated and compared to an expected difference. The expected difference can be, for example, a shorter time difference for certain kinds of content items (e.g., content items where users typically respond quickly, or content items have a small amount of text), or a longer time difference for other kinds of content items (e.g., content items having a larger amount of text or typically requiring additional user thought).

The expected difference can be provided from a content item provider (e.g., an advertiser) or can be determined, for example, by training a classifier. If the difference is closer to the expected difference, then the probability that the call resulted from the interaction is higher.

A higher value measure for an interaction indicates a higher probability that the call resulted from that interaction. For example, because interaction 1 has a higher value measure (V1) than interaction 2 (V2), it is more likely that (on the basis of value measure) that the call resulted from interaction 1 than from interaction 2.

Another example signal is whether the location of the call matches the location of the client device associated with an interaction. The location of the call can be estimated using the area code of the phone number of the caller or other information (e.g., GPS coordinates provided by a mobile phone). The location of the client device can be estimated using, for example, the internet protocol (IP) address of the client device, or other information (e.g., GPS coordinates provided by a mobile phone, a search history associated with the client device, and so on). The closer the two locations are, the higher the probability that the call resulted from the interaction.

The call can be attributed to one or both of the interactions. For example, if the probability that the call resulted from the first interaction is higher than the probability that the call resulted from the second interaction, then the call can be attributed exclusively to the first interaction, or the call can be attributed in a fractional amount to each interaction. In some implementations, the call is attributed in whole to an interaction if the probability that the call resulted from that interaction is greater than a threshold (e.g., p>0.75), and otherwise is attributed fractionally.

In some implementations, calls are transcribed and keywords are detected in the transcription to attribute calls to interactions. For example, where keywords detected in the transcription of a call match keywords presented in an interaction, the phone call is more likely to have resulted from that interaction. Thus, if an ad showed a message that said "10% discount just for today," then the likelihood that a phone call resulted from the ad is larger when the phone call includes the words "10% discount" or "discount today." In some implementations, call transcription is optional to protect user privacy. For example, the user can be asked during the call (e.g., by an automated system or a salesperson) for permission to transcribe the call.

Although FIG. 2 illustrates a single phone call and three interactions, an advertising campaign can involve many interactions and many phone calls resulting from those interactions. For each of the phone calls, the call can be attributed to one or more of the interactions. Using the attributions, a probability of a phone call for a future interaction can be estimated. For example, for a certain ad provided a number of times in response to a keyword, the number of resulting calls can be used to estimate the probability that providing the ad in response to the keyword in the future will result in a call.

The context of an interaction or call can be used to refine an estimated probability of a call. By attributing calls to specific interactions with known contexts, a probability can be estimated for future interactions based on the contexts of those future interactions. The context of an interaction is, for example, the time of day the interaction occurred, whether a click involved in the interaction was a "long" click (e.g., where the user returned to an original web page after a threshold amount of time after viewing a web page after a click), and so on.

For example, by examining the time that an interaction occurred (e.g., when an ad was served), the probability that a future ad will result in a call can be based on interactions at times that resulted in calls. So, for example, in determining the probability of a call from serving an ad at 3:00 PM, the phone calls that resulted when previously serving the ad at 3:00 PM can be considered. In another example, by examining a value measure of an interaction (e.g., the placement of an ad on a web page), the probability of a future interaction matching that value measure can be based on interactions with that value measure that resulted in calls. So, for example, in determining the probability of a call from serving an ad at the top of a web page or on the side of a web page, the phone calls that resulted from serving the ad at the top or on the side can be considered.

The probability that an interaction with an online content item will result in a phone call can be used to determine a rank score for the online content item. The rank score can be based, for example, on the expected revenue from serving the online content item to a client device. In some implementations, the rank score is used to determine whether to select an online content item, or to boost or decrease an online content item's position among multiple content items (e.g., to move the content item, such as an advertisement, up or down a web page, or from the top of a web page to a side of a web page).

In addition to or instead of determining the probability of a call, a probability of a good call can be determined. A good call can be defined in various ways. In general, a good call is one that is more beneficial to a content provider. For example, when the content provider is an advertiser, a good call may be a call that results in a sale or a call from a customer who is more ready to buy.

Good calls may be identified in a number of ways. For example, a good call can be a call that lasts over a certain amount of time (e.g., 1 minute), or lasts within a certain range of times (e.g., between 5 and 15 minutes). The amount of time can be specified by a content provider, such as an advertiser. In another example, a content provider can report back a value for each call indicating the quality of the call (e.g., a person handling the call for the advertiser can enter a number on a phone at the end of the call, or fill out a form on a web site, and so on). The reported values can be used to determine a probability of a good call.

FIG. 3A shows a table illustrating how expected revenue can be determined for an online content item. For purposes of illustration, two ads (Ad1 and Ad2) from two different advertisers are discussed. The advertisers bid for clicks on their ads. For example, the advertisers can bid for clicks in response to searches for a certain keyword in a search engine.

In this example, both advertisers bid $10 for a click. An advertising system determines that the probability of a click (Pclick) on Ad1 is 0.1 and the probability of a click on Ad2 is 0.05. These probabilities can be determined using various techniques, such as, for example, by examining the click-through rate (CTR) of those ads in the past. Because the probability of a click is higher for Ad1, the expected revenue for serving Ad1 is higher ($1 for Ad1 versus $0.50 for Ad2). Due to the higher expected revenue, Ad1 can be assigned a higher rank score than Ad2, and, in some implementations, Ad1 will be served more frequently than Ad2 or in a better position than Ad2.

If the advertiser for Ad2 wants to increase the rank score of Ad2, the advertiser can increase his bid, or attempt to improve the appearance of Ad2 to increase its probability of being clicked. However, the advertiser for Ad2 may be more interested in receiving phone calls in response to Ad2 than in receiving clicks in response to Ad2.

FIG. 3B shows a table illustrating how expected revenue can be determined for an online content item based on a probability of a call. In this example, the advertiser for Ad1 is not bidding on a phone call, and the advertiser for Ad2 is bidding $20 for a phone call. The expected revenue for clicks on Ad2 is the same as it was in FIG. 3A (i.e., $0.50). However, since the probability of a call (Pcall) from serving Ad2 is 0.05, the expected revenue for calls from Ad2 is $1 ($20*0.05). Thus, when the expected revenue from calls ($1) is combined with the expected revenue from clicks ($0.50), the total expected revenue is $1.50. Since the total expected revenue for Ad2 ($1.50) is higher than the total expected revenue for Ad1 ($1), Ad2 can be assigned a higher rank score than Ad1.

In some implementations, the advertiser's bid for a phone call can be determined automatically based on the advertiser's other bids (e.g., the advertiser's bid for a click). For example, the bid for a call can be a fixed amount or percentage above the bid for a click. The amount or percentage can be based, for example, on keywords associated with the advertiser's ad campaign.

Figure 4:
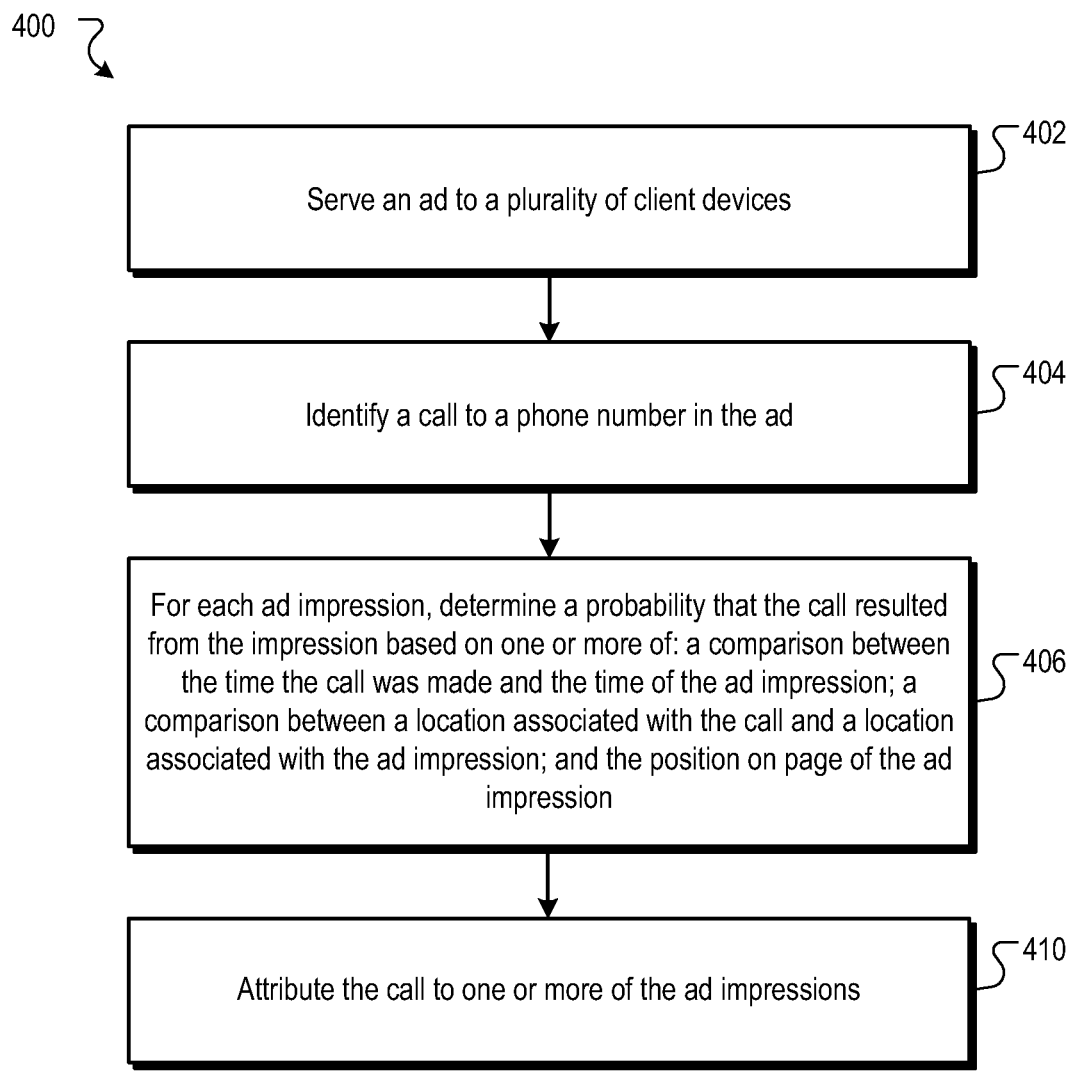
FIG. 4 is a flow diagram of an example process for attributing a phone call to an ad impression.

FIG. 4 is a flow diagram of an example process 400 for attributing a phone call to an ad impression. In some implementations, the process is performed by an advertising management system (e.g., advertising management system 104 of FIG. 1). For purposes of illustration, the process 400 will be described with respect to a system that performs the process 400.

The system generates a number of ad impressions by serving an ad to a plurality of client devices (step 402). Each ad impression is served to a client device at a particular time, and at least some of the ad impressions will be served to unique client devices at unique times.

The system identifies a call to a phone number in the ad (step 404). In some implementations, the phone number is displayed in the ad. In some other implementations, the ad provides a link to a web site that includes the phone number.

For each ad impression, the system determines a probability that the phone call resulted from the ad impression (e.g., that a user saw the ad impression and decided to call the phone number) (step 406). The probability is based on one or more factors. For example, the system may compare the time when the call was made to the time of the ad impression and a location associated with the call (e.g., based on the area code of the calling number) to a location associated with the ad impression (e.g., based the IP address of the client device). The system also may consider the position on a web page of the ad impression (e.g., whether the ad was displayed on the top of the page or the side of the page).

The system attributes the call to one or more of the ad impressions (step 410). For example, the system may attribute the call to a single ad impression having the highest determined probability, in a fractional amount to each ad impression based on the determined probability of each ad impression, or to the single ad impression having the highest probability if that probability exceeds a threshold, and otherwise in a fractional amount to each of the ad impressions.

Figure 5:
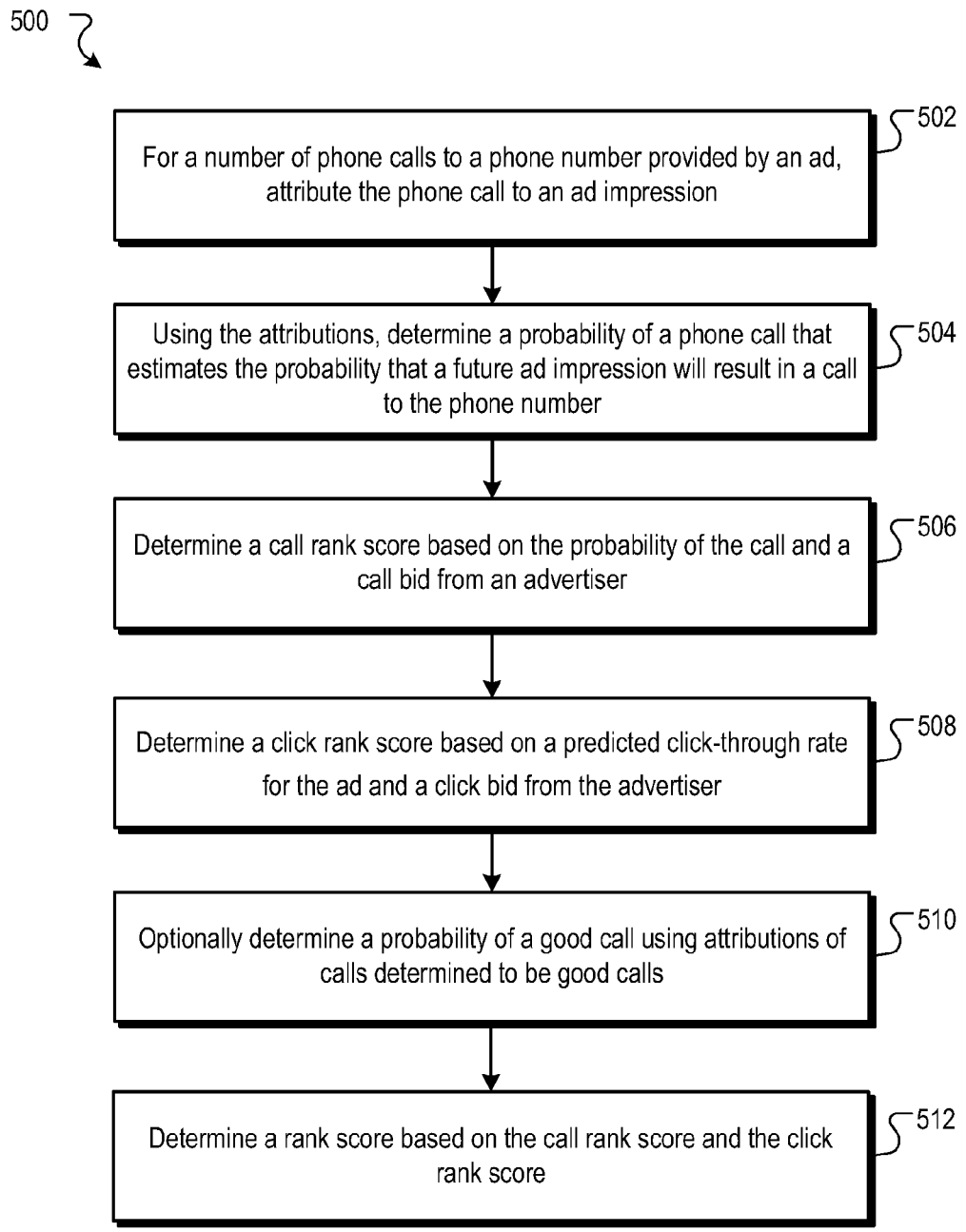
FIG. 5 is a flow diagram of an example process for determining a rank score of an advertisement.

FIG. 5 is a flow diagram of an example process 500 for determining a rank score of an advertisement. In some implementations, the process 500 is performed by an advertising management system, e.g., advertising management system 104 of FIG. 1. For purposes of illustration, the process 500 will be described with respect to a system that performs the process 500.

For a number of phone calls to a phone number provided by an ad, the system attributes each phone call to an ad impression (step 502). In some implementations, the system performs the process 400 described in FIG. 4 to attribute phone calls to ad impressions.

Using the attributions, the system determines a probability of a phone call (step 504). The probability of a call estimates the probability that a future ad impression will result in a call to the phone number (e.g., that a user will view the ad and decide to call the phone number). In some implementations, the system uses the historical call rate for the ad when it has a value measure of the future ad impression to determine the probability of the phone call.

The system determines a call rank score based on the probability of the call and a call bid from an advertiser (step 506). The expected revenue from calls illustrated in FIG. 3B is an example of a call rank score.

The system determines a click rank score based on the a predicted click-through rate for the ad and a click bid from the advertiser (step 508). The expected revenue from clicks illustrated in FIG. 3B is an example of a click rank score. The predicted click-through rate is typically determined using historical click-through rates for the ad.

In some implementations, the system determines a probability of a good call using attributions of calls determined to be good calls (step 510). For example, the system may determine whether a call is a good call based on a duration of the call (e.g., whether the call has a duration that exceeds a threshold duration or is within a duration range). In some of those implementations, the system determines whether the call is a good call based on detection of one or more keywords (e.g., "buy") spoken during the call. The system typically transcribes the call to detect the keywords. The system also may obtain a rating from the advertiser (or an entity associated with the advertiser) regarding the quality of the calls (e.g., a person answering the phone number provides a rating using the phone's keypad or a computer).

The system determines a rank score based on the call rank score and the click rank score (step 512). The expected revenue from combined calls and clicks illustrated in FIG. 3B is an example of a rank score.

Figure 6:
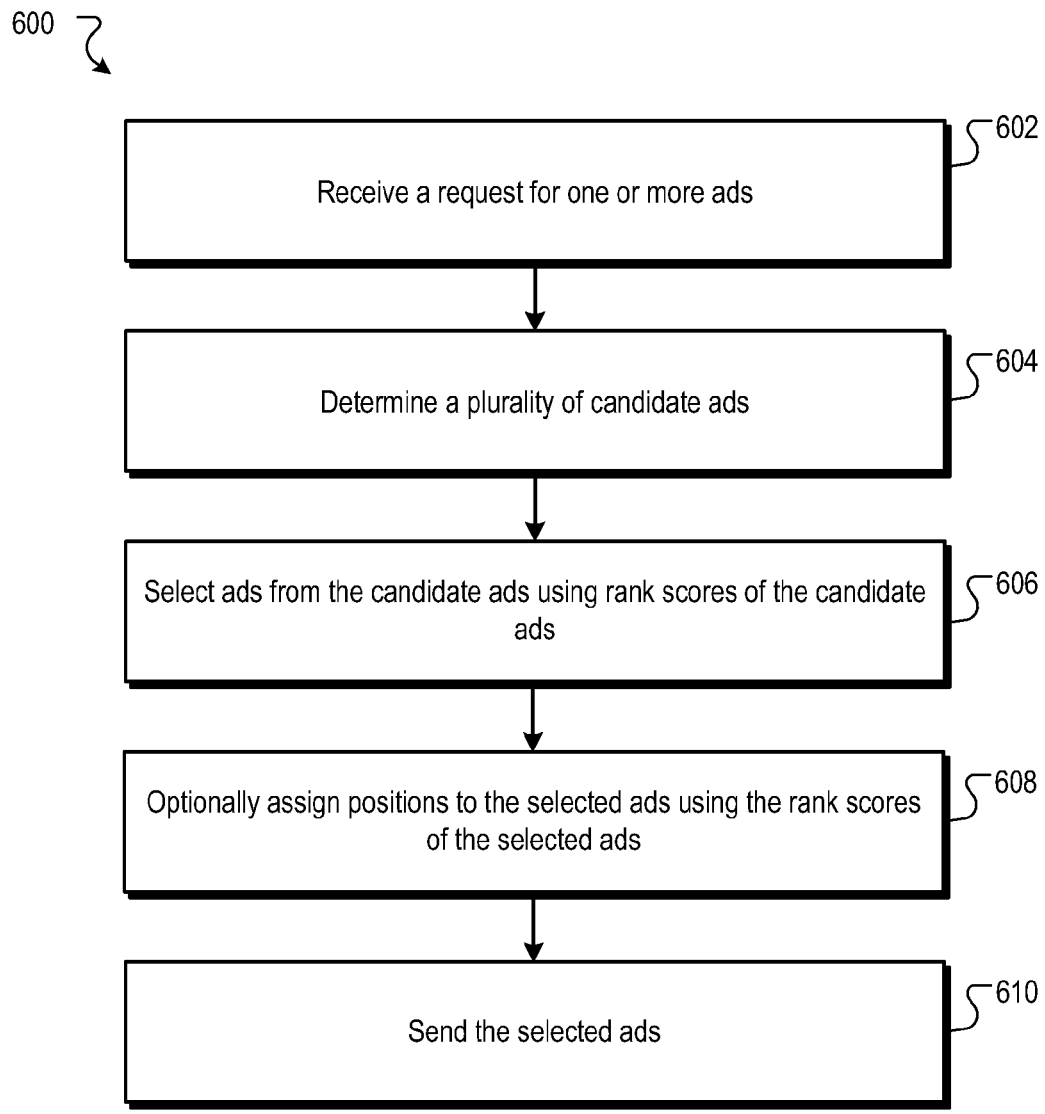
FIG. 6 is a flow diagram of an example process for serving ads using rank scores of the ads.

FIG. 6 is a flow diagram of an example process 600 for serving ads using rank scores of the ads. In some implementations, the process 600 is performed by an advertising management system, e.g., advertising management system 104 of FIG. 1. For purposes of illustration, the process 600 will be described with respect to a system that performs the process 600.

The system receives a request for one or more ads (step 602). The ads are typically for presentation with content, e.g., with search results or on a mobile application.

The system determines a plurality of candidate ads (step 604). In some implementations, the candidate ads are determined by selecting ads associated with a keyword matching a keyword provided with the request for ads.

The system selects responsive ads from the candidate ads using rank scores of the candidate ads (step 606). Typically, the system ranks the candidate ads and selects a number of the highest ranking ads. In some implementations, the system determines the rank scores using the process 500 illustrated in FIG. 5.

In some implementations, the system assigns positions to the selected ads using the rank scores (step 608). For example, the system assigns positions based on the rank scores of the ads, and the positions determine an order for the presentation of the selected ads (e.g., on the top or side of a page, in the order on a page, or in a time order to be displayed in a mobile application). In some implementations, the system assigns positions based on factors other than the rank score and uses the rank score to adjust the positions.

The system sends the selected ads (step 610). In some implementations, the system sends the assigned position of the ads or sends the ads in the order of their assigned positions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by one or more processors, the method comprising:
  determining a rank score for an online content item, wherein the online content item includes a phone number, and wherein determining the rank score comprises:
    for each call of a plurality of phone calls to the phone number, attributing the call to an online content interaction of a plurality of different online content interactions, wherein each online content interaction refers to a delivery of the online content item to a particular client device at a particular time, determining a probability of a call using the online content interactions attributed to the phone calls, wherein the probability estimates the probability that a future online content interaction will result in a call to the phone number, and using the probability of a call in determining the rank score for the online content item;

determining, using the rank score, whether to provide the online content item to a client device; and providing the online content item to the client device upon determining to do so using the rank score.

2. The method of claim 1, wherein using the probability of a call in determining the rank score comprises determining a user interaction probability based on the probability of a call and a predicted click-through rate for the online content item.

3. The method of claim 1, wherein using the probability of a call in determining the rank score comprises:

obtaining a call bid and a click bid from an online content provider, wherein the call bid specifies an amount of money the online content provider is willing to pay for a call resulting from a delivery of an online content item, and wherein the click bid specifies an amount of money the online content provider is willing to pay for a click on an online content item;

determining a call rank score based on the probability of a call and the call bid;

determining a click rank score based on a predicted click-through rate for the online content item and the click bid; and determining the rank score based on the call rank score and the click rank score.

4. The method of claim 1, wherein determining the rank score further comprises:

for each call of the plurality of phone calls to the phone number, determining whether the call was a good call based on a duration of the call;

determining a probability of a good call using the attributions of the calls determined to be good calls; and using the probability of a good call to determine the rank score.

5. The method of claim 4, wherein a good call is one having a duration that exceeds a threshold duration or is within a duration range.

6. The method of claim 1, wherein determining the rank score further comprises:

for each call of the plurality of phone calls to the phone number, determining whether the call was a good call based on detection of one or more keywords spoken during the call;

determining a probability of a good call using the attributions of the calls determined to be good calls; and using the probability of a good call to determine the rank score.

7. The method of claim 1, wherein determining the rank score further comprises:

for each call of the plurality of phone calls to the phone number, obtaining a rating from an online content provider regarding the quality of the call and determining whether the call was a good call based on the rating;

determining a probability of a good call using the attributions of the calls and their respective ratings; and using the probability of a good call to determine the rank score.

8. The method of claim 1, wherein the online content item is an ad.

9. The method of claim 8, further comprising:

receiving a request for one or more ads;

determining a plurality of candidate ads including the ad; and using the rank score to select the ad from the candidate ads and providing the ad in response to the request.

10. The method of claim 8, further comprising:

receiving a request for a plurality of ads for presentation with content;

determining a plurality of candidate ads including the ad;

selecting a plurality of responsive ads including the ad and assigning a position to each responsive ad; and using the rank score to boost the ad's position among the responsive ads and providing the responsive ads in response to the request.

11. A system comprising:

one or more processors configured to interact with a computer storage medium in order to perform operations comprising:

determining a rank score for an online content item, wherein the online content item includes a phone number, and wherein determining the rank score comprises:

for each call of a plurality of phone calls to the phone number, attributing the call to an online content interaction of a plurality of different online content interactions, wherein each online content interaction refers to a delivery of the online content item to a particular client device at a particular time, determining a probability of a call using the online content interactions attributed to the phone calls, wherein the probability estimates the probability that a future online content interaction will result in a call to the phone number, and using the probability of a call in determining the rank score for the online content item;

determining, using the rank score, whether to provide the online content item to a client device; and providing the online content item to the client device upon determining to do so using the rank score.

12. The system of claim 11, wherein using the probability of a call in determining the rank score comprises determining a user interaction probability based on the probability of a call and a predicted click-through rate for the online content item.

13. The system of claim 11, wherein using the probability of a call in determining the rank score comprises:

obtaining a call bid and a click bid from an online content provider, wherein the call bid specifies an amount of money the online content provider is willing to pay for a call resulting from a delivery of an online content item, and wherein the click bid specifies an amount of money the online content provider is willing to pay for a click on an online content item;

determining a call rank score based on the probability of a call and the call bid;

determining a click rank score based on a predicted click-through rate for the online content item and the click bid; and determining the rank score based on the call rank score and the click rank score.

14. The system of claim 11, wherein determining the rank score further comprises:

for each call of the plurality of phone calls to the phone number, determining whether the call was a good call based on a duration of the call;

determining a probability of a good call using the attributions of the calls determined to be good calls; and using the probability of a good call to determine the rank score.

15. The system of claim 14, wherein a good call is one having a duration that exceeds a threshold duration or is within a duration range.

16. The system of claim 11, wherein determining the rank score further comprises:
   for each call of the plurality of phone calls to the phone number, determining whether the call was a good call based on detection of one or more keywords spoken during the call;
   determining a probability of a good call using the attributions of the calls determined to be good calls; and
   using the probability of a good call to determine the rank score.

17. The system of claim 11, wherein determining the rank score further comprises:
   for each call of the plurality of phone calls to the phone number, obtaining a rating from an online content provider regarding the quality of the call and determining whether the call was a good call based on the rating;
   determining a probability of a good call using the attributions of the calls and their respective ratings; and
   using the probability of a good call to determine the rank score.

18. The system of claim 11, wherein the online content item is an ad.

19. The system of claim 18, the operations further comprising:
   receiving a request for one or more ads;
   determining a plurality of candidate ads including the ad; and
   using the rank score to select the ad from the candidate ads and providing the ad in response to the request.

20. The system of claim 18, the operations further comprising:
   receiving a request for a plurality of ads for presentation with content;
   determining a plurality of candidate ads including the ad;
   selecting a plurality of responsive ads including the ad and assigning a position to each responsive ad; and
   using the rank score to boost the ad's position among the responsive ads and providing the responsive ads in response to the request.

21. A computer storage medium encoded with a computer program, the program comprising instructions that when executed by data processing apparatus cause the data processing apparatus to perform operations comprising:
   determining a rank score for an online content item, wherein the online content item includes a phone number, and wherein determining the rank score comprises:
      for each call of a plurality of phone calls to the phone number, attributing the call to an online content interaction of a plurality of different online content interactions, wherein each online content interaction refers to a delivery of the online content item to a particular client device at a particular time,
      determining a probability of a call using the online content interactions attributed to the phone calls, wherein the probability estimates the probability that a future online content interaction will result in a call to the phone number, and
      using the probability of a call in determining the rank score for the online content item;
   determining, using the rank score, whether to provide the online content item to a client device; and
   providing the online content item to the client device upon determining to do so using the rank score.

* * * * *